US006981536B2

United States Patent
Lien et al.

(10) Patent No.: US 6,981,536 B2
(45) Date of Patent: Jan. 3, 2006

(54) LAMINATOR SWING ARM ASSEMBLY

(75) Inventors: Brent D. Lien, Minneapolis, MN (US); Ted M. Hoffman, Eden Prairie, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 71 days.

(21) Appl. No.: 10/418,730

(22) Filed: Apr. 18, 2003

(65) Prior Publication Data

US 2004/0003899 A1 Jan. 8, 2004

Related U.S. Application Data

(60) Provisional application No. 60/373,980, filed on Apr. 19, 2002.

(51) Int. Cl.
*B32B 31/00* (2006.01)

(52) U.S. Cl. .................. 156/378; 156/555; 156/582; 156/583.1

(58) Field of Classification Search ................ 156/350, 156/351, 365, 378, 499, 555, 580, 582, 583.1, 156/272.2, 379.8, 552; 100/327, 334, 155 R, 100/160, 176
See application file for complete search history.

(56) References Cited

U.S. PATENT DOCUMENTS

| 3,623,933 | A | * | 11/1971 | Staats | 156/552 |
|---|---|---|---|---|---|
| 4,060,441 | A | * | 11/1977 | Ohta et al. | 156/234 |
| 4,276,112 | A | * | 6/1981 | French et al. | 156/360 |
| 4,387,000 | A | * | 6/1983 | Tancredi | 156/495 |
| 4,619,728 | A | * | 10/1986 | Brink | 156/555 |
| 5,220,343 | A | | 6/1993 | Takanashi et al. | 346/1.1 |
| 5,368,677 | A | | 11/1994 | Ueda et al. | 156/362 |
| 5,480,509 | A | * | 1/1996 | Matsuo et al. | 156/522 |
| 5,554,250 | A | * | 9/1996 | Dais et al. | 156/353 |
| 5,584,962 | A | * | 12/1996 | Bradshaw et al. | 156/495 |
| 5,600,362 | A | | 2/1997 | Morgavi et al. | 347/218 |
| 5,820,277 | A | | 10/1998 | Schulte | 400/223 |
| 6,094,209 | A | | 7/2000 | Nardone et al. | 347/171 |
| 6,095,220 | A | | 8/2000 | Kobayashi et al. | 156/540 |
| 6,105,861 | A | | 8/2000 | Kuit | 235/375 |
| 6,176,286 | B1 | * | 1/2001 | Kitagawa et al. | 156/555 |
| 6,325,607 | B1 | * | 12/2001 | Atake | 425/122 |
| 2001/0053947 | A1 | | 12/2001 | Lenz et al. | 700/117 |
| 2002/0088553 | A1 | * | 7/2002 | Whitby | 156/556 |

FOREIGN PATENT DOCUMENTS

| EP | 1 486 342 | 2/1998 |
|---|---|---|
| JP | 403247477 A | 11/1991 |
| JP | 407039644 A | 2/1995 |
| JP | 1268457 A | 10/1999 |
| JP | 11300830 A | 11/1999 |
| WO | WO 9619355 A1 | 6/1996 |

OTHER PUBLICATIONS

International Search Report for International Application No. PCT/US 03/12106 dated Aug. 28, 2003.
Office Communication from U.S. Appl. No. 10/418,731, filed Apr. 18, 2003, date mailed: May 3, 2004.
Office Communication from U.S. Appl. No. 10/419,055, filed Apr. 18, 2003, date mailed: May 17, 2004.
Machine translation of JP 11–300830 to Toppan Printing Co. from Japanese Patent Office website.
Machine translation of JP 07–39644 to Takase et al. from Japanese Patent Office website.

* cited by examiner

*Primary Examiner*—James Sells
(74) *Attorney, Agent, or Firm*—Westman, Champlin & Kelly

(57) ABSTRACT

A swing arm assembly includes a swing frame, a laminating roller, and a motor. The swing frame is rotatably mountable to a frame of a card laminator for pivotal movement relative to the frame between open and closed positions. The laminating roller is movably mounted to the swing frame. The motor is mounted to the swing frame and is configured to drive a roller actuator to move the laminating roller relative to the swing frame between a laminating position and a recessed position.

30 Claims, 8 Drawing Sheets

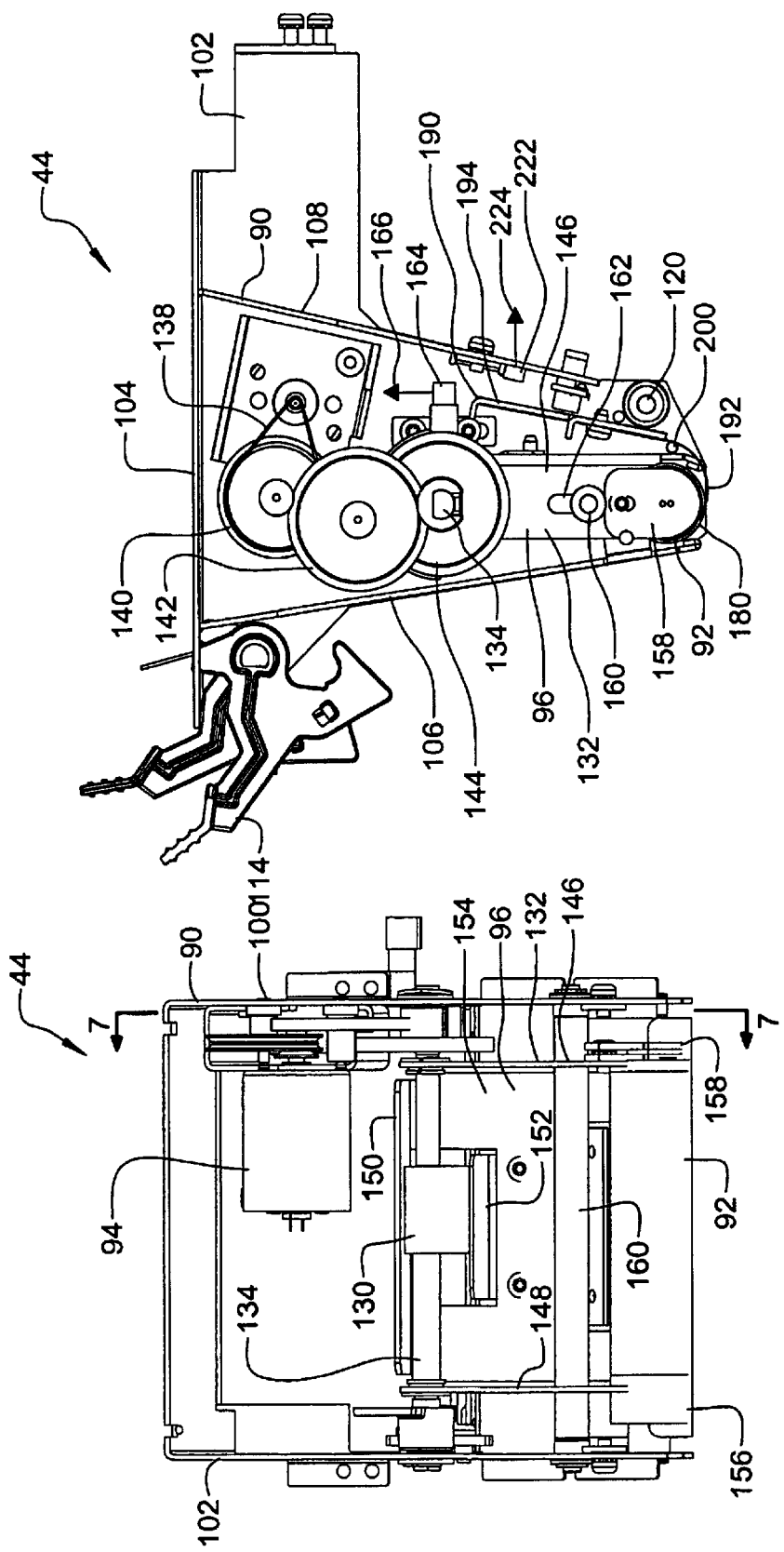

US 6,981,536 B2

LAMINATOR SWING ARM ASSEMBLY

The present application claims the benefit of U.S. provisional patent application Ser. No. 60/373,980, filed Apr. 19, 2002.

FIELD OF THE INVENTION

The present invention generally relates to identification card laminators and, more particularly, to a swing arm assembly for use in a card laminator.

BACKGROUND OF THE INVENTION

Identification cards are commonly used as a vehicle for identifying the bearer of the card (e.g., driver's licenses) for access control, and other purposes. These identification cards are produced using identification card manufacturing systems.

Identification card manufacturing systems generally include an identification card printer and laminator, such as the HDP and DTC line of identification card printers and laminators produced by Fargo Electronics, Inc. of Eden Prairie, Minn. Other card processing devices that can be utilized in identification card manufacturing systems include, for example, a card flipper and a data encoder. These devices are generally operated under the control of host applications running on a computer.

Identification card printers are configured to handle and print on rigid or semi-rigid card substrates, a function traditional paper sheet feed printers are incapable of performing. Identification card printers generally include a card supply, a card transport mechanism, a printhead, and a controller for controlling the components in response to print job instructions received from the host application. The card supply contains a stack of identification cards that are individually delivered to the printhead by the card transport mechanism. The printhead prints an image to a surface of the card in accordance with the print job.

Identification card laminators are generally configured to apply an overlaminate material to printed surfaces of cards. Such card laminators generally include a supply of overlaminate material, a card transport mechanism, and a laminating mechanism. The card transport mechanism is configured to transport individual cards between the laminating mechanism and a platen roller. The supply of overlaminate material extends between supply and take-up rolls and between the laminating mechanism and the card. The laminating mechanism includes a heating element, such as a heated roller, and applies pressure and heat to the overlaminate material, which causes a portion of the overlaminate material to transfer to the surface of the card. The transferred overlaminate material protects the surface of the card from the environment. Additionally, the overlaminate material can include security markings such as holograms, that can be used to authenticate the card and deter counterfeiting.

Some card laminators include swing arm assemblies, to which the heated roller of the laminating mechanism is mounted. The swing arm can be raised to an open position, and lowered to an operating position. This allows the user to gain access to the interior of the laminator so that a supply of overlaminate film can be installed or other items can be serviced. Additionally, the laminating roller is configured for movement between a laminating position, in which it is positioned proximate to the platen roller for laminating a card, and a recessed position, in which the laminating roller is displaced from the platen roller. A drive motor, usually mounted to a side wall of the frame of the laminator adjacent the swing frame, is configured to drive the laminating roller between the laminating and recessed positions through engagement with a drive mechanism that is mounted to the swing frame. The drive mechanism drives a cam, which in turn moves a laminating roller between the laminating and recessed positions. When the swing frame is open, the drive is disengaged from the motor. When the swing frame is closed, the drive is designed to reengage the motor to allow for the driving of the laminator between the laminating and recessed positions.

Unfortunately, the position of the drive mechanism upon reengagement with the motor can change from its previous position. Such a change can affect the position of the cam and, thus, the position of the laminating roller relative to the platen roller and a card that is to be laminated. This can result in inaccurate positioning of the laminating roller relative to the platen roller or card, which prevents the desired pressure and heat from being accurately applied to the overlaminate material and the card. As a result, laminating defects, card jams, and other laminator malfunctions can occur.

The present invention provides a solution to these and other problems and offers advantages over the prior art.

SUMMARY OF THE INVENTION

The present invention is directed to a swing arm assembly for use in a card laminator that avoids the problems described above. The swing arm assembly includes a swing frame, a laminating roller, and a motor. The swing frame is rotatably mountable to a frame for pivotal movement relative to the frame between open and closed positions. The laminating roller is movably mounted to the swing frame. The motor is mounted to the swing frame and is configured to drive a roller actuator to move the laminating roller relative to the swing frame between a laminating position and a recessed position.

Other features and benefits that characterize embodiments of the present invention will be apparent upon reading the following detailed description and review of the associated drawings.

BRIEF DESCRIPTION OF THE DRAWINGS

FIG. 6 is a front view of a swing arm assembly with a front plate removed.

FIG. 7 is a side view of the swing arm assembly of FIG. 6 taken generally along line 7—7, but with a front plate present.

DETAILED DESCRIPTION OF THE PREFERRED EMBODIMENTS

Figure 1:
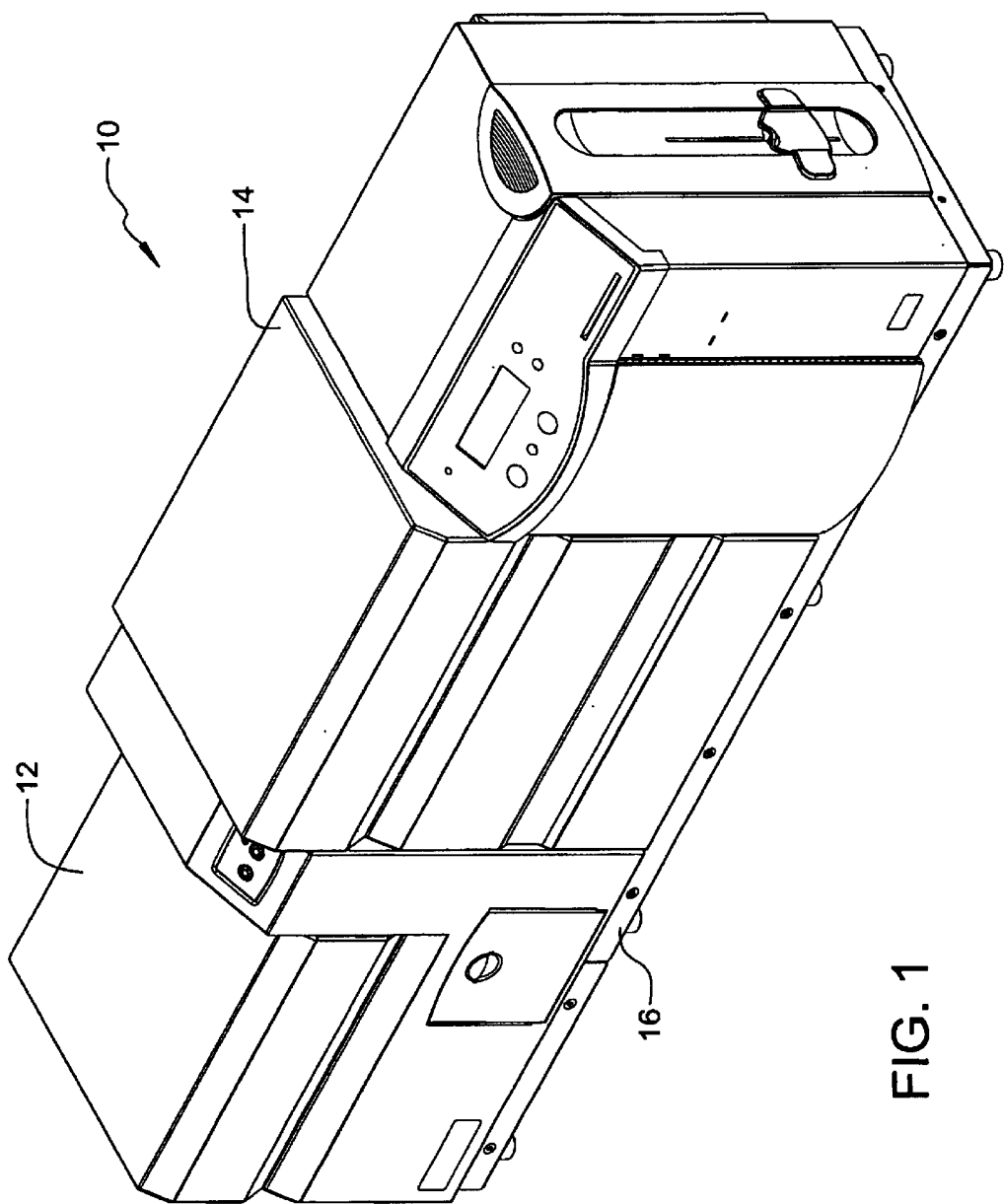
FIG. 1 is a perspective view of an identification card manufacturing system.

FIG. 1 is a perspective view of an identification card manufacturing system 10 that includes an identification card laminator 12 that is formed in accordance with embodiments of the present invention. System 10 also includes an identification card printer 14 that is joined to laminator 12 by a unification mounting 16 to form system 10 as a single unit. This configuration allows for cards that are processed by printer 14 to be transferred to laminator 12 for lamination without user intervention. Such a system is described in co-pending patent application Ser. No. 10/419,055 for an "IDENTIFICATION CARD MANUFACTURING DEVICE MODULE UNIFICATION" filed on even date herewith and assigned to Fargo Electronics, Inc. of Eden Prairie, Minn., which is hereby incorporated by reference in its entirety. Alternatively, the identification card printer 14 and the identification card laminator 12 can be formed as separate units that operate independent of each other.

Figure 2:
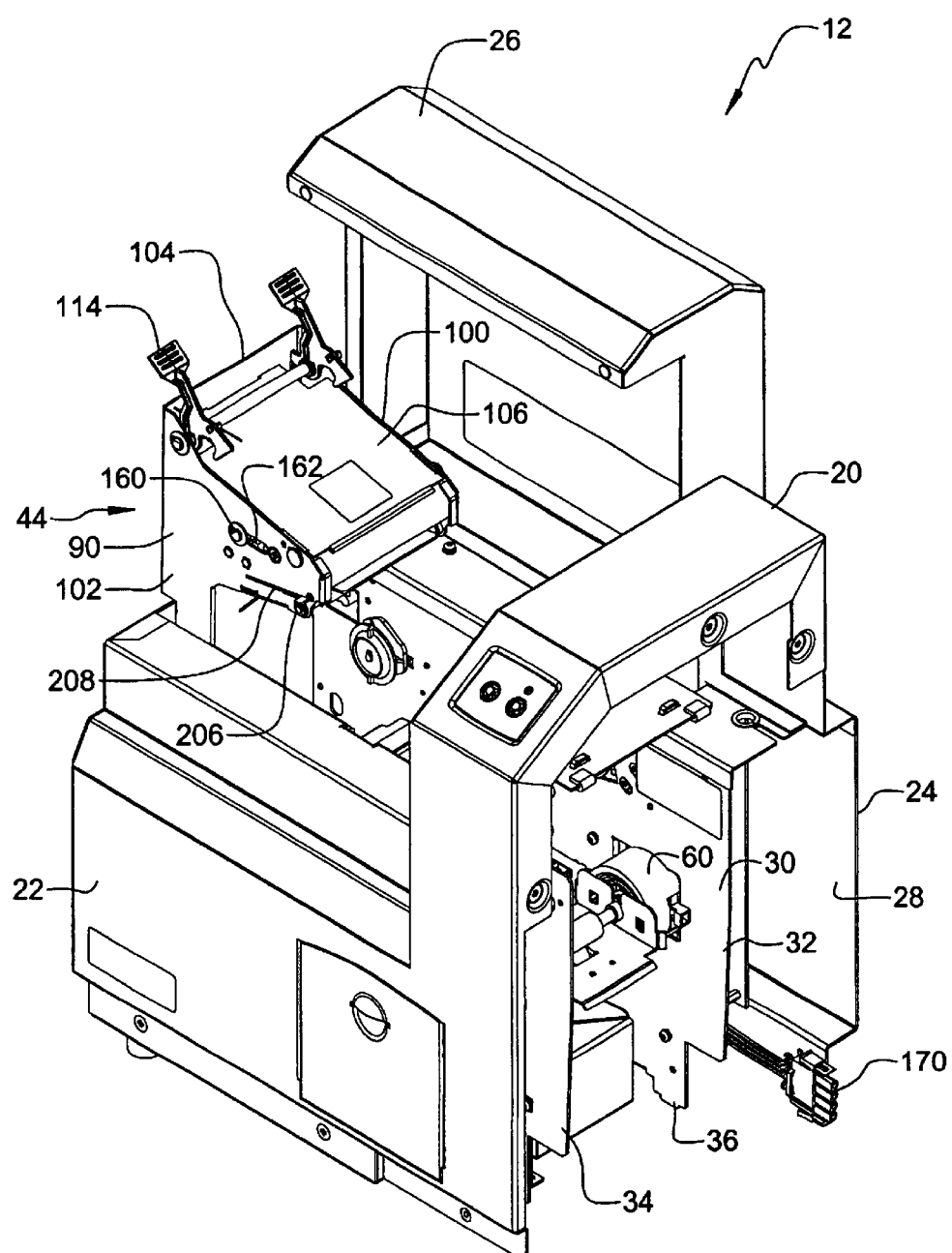
FIG. 2 is a perspective view of an identification card laminator in accordance with embodiments of the invention.

FIG. 2 is a perspective view of an identification card laminator 12 in accordance with embodiments of the invention. Identification card laminator 12 includes a housing 20 comprising side walls 22 and 24, a top cover 26 shown as being opened, and an open end 28. Laminator 12 can include an end cover (not shown) to cover open end 28 and include a card input for receiving and/or storing individual or multiple cards when the card laminator 12 is configured for stand-alone operation. Open end 28 allows for attachment to identification card printer 14 using unification mounting 16, as illustrated in FIG. 1.

Figure 3:
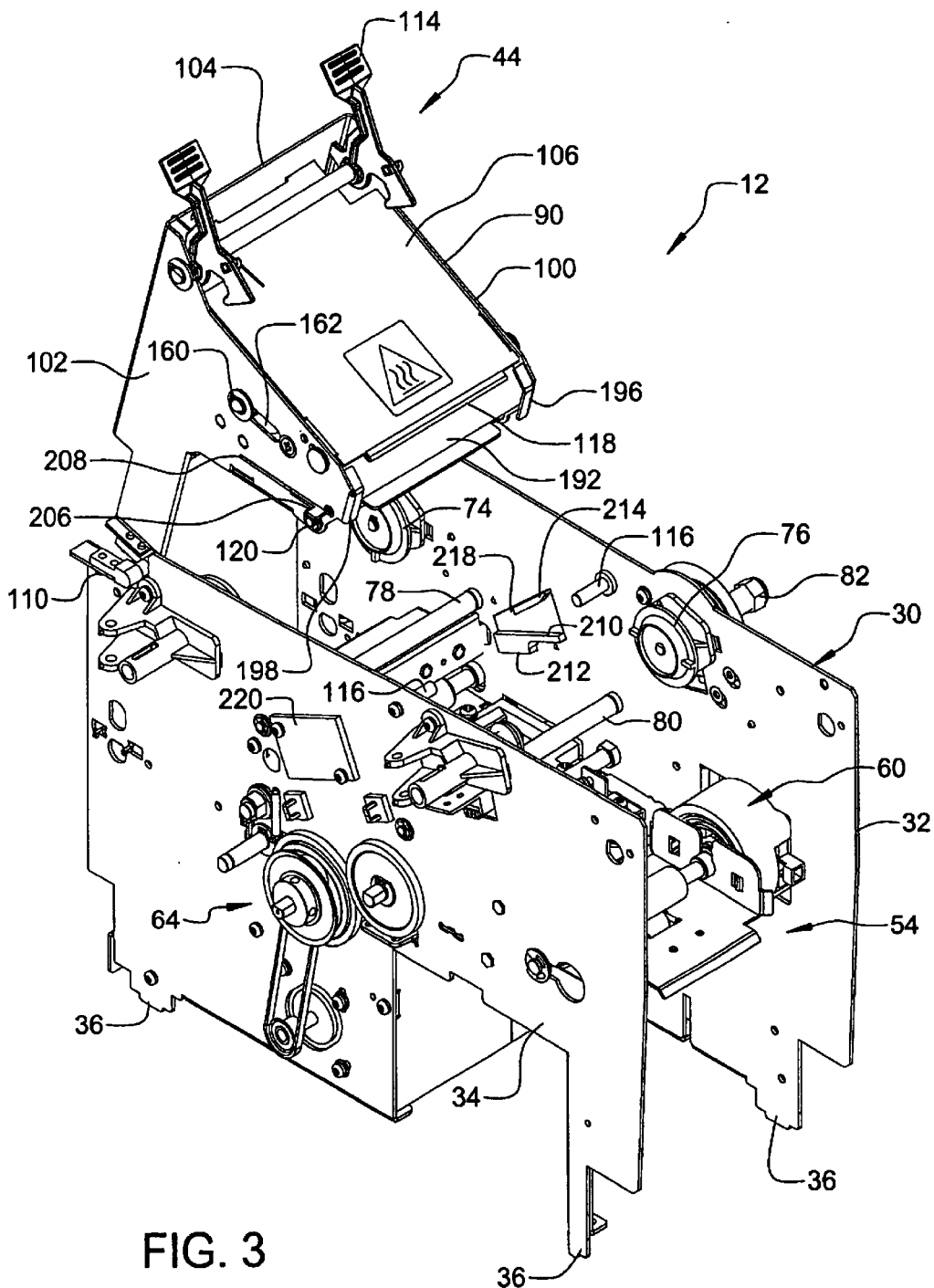
FIG. 3 is a perspective view of an identification card laminator with a housing removed.

FIG. 3 is a perspective view of laminator 12 with housing 20 removed. Laminator 12 includes a frame 30 that is enclosed by housing 20 and supports the primary card processing components of laminator 12. Frame 30 includes side plates 32 and 34 to which the components of laminator 12 can be mounted. Frame 30 includes support legs 36 that can be attached to a base (not shown).

The general components of identification card laminator 12 will be discussed with reference to FIGS. 4 and 5, which are simplified side views of laminator 12 with housing 20 and side plate 34 of frame 30 removed. In general, laminator 12 includes a card transport 40, a supply of overlaminate material 42, swing arm assembly 44, and a controller 46. Card transport 40 includes feed rollers 48 and 50 and a platen roller 52. Card transport 40 receives cards at an input 54 and transports individual cards, such as card 56 shown in FIG. 4, through laminator 12 during laminating operations. A card flipper or inverter 60, driven by a motor 61, can invert cards at input 54, so that both sides of the cards can be laminated. Feed rollers 48 and 50 and platen roller 52 are driven by a motor 62 (FIG. 4) through a suitable gear and pulley arrangement, as illustrated at 64 or FIG. 3.

The supply of overlaminate material 42 extends between a supply roll 70 and a take-up roll 72 that are respectively mounted to hubs 74 and 76, shown in FIG. 3. Guide rollers 78 and 80 mounted to frame 30 are provided to guide overlaminate material 42 under swing arm assembly 44. A laminating drive 82 can control the feeding and tension of the overlaminate material 42 between supply roll 70 and take-up roll 72, in accordance with known methods.

Swing arm assembly 44 generally includes a swing frame 90, a laminating roller 92, a motor 94, and a roller actuator 96. Swing frame 90 includes side support plates 100 and 102, a top plate 104, and front and rear plates 106 and 108, as shown in FIGS. 3, 4 and 5. Side support plate 102 is shown as being removed in FIGS. 4 and 5. Side plates 100 and 102 are each rotatably mounted to a corresponding side plate 32 or 34 of frame 30 by a hinge or bracket 110. This connection allows swing frame 90 to pivot about axis 112 (FIG. 4) relative to frame 30 between an open position, shown in FIGS. 2 and 3 and a closed position, shown in FIGS. 4 and 5.

The positioning of swing arm assembly 44 in the open position allows for replacement of the overlaminate material 42, or for the performance of other services to laminator 12. Swing arm assembly 44 is placed in the closed position during laminating operations. Swing arm assembly 44 is held in a closed or operating position with latches 114, which latch onto suitable latch pins 116 mounted on side walls 32 and 34 of frame 30.

Swing arm assembly 44 includes overlaminate guides, such as bottom guide surface 118 of front plate 106 and rear overlaminate guide roller 120. These overlaminate guides operate to align the overlaminate material 42 as desired relative to laminating roller 92, as shown in FIG. 4. Bottom guide surface 118 engages overlaminate material 42 and controls the angle at which overlaminate material 42 meets laminating roller 92 when swing frame 44 is in the closed position. Rear overlaminate guide roller 120 is mounted between side support plates 100 and 102 of swing frame 90 and operates to align overlaminate material 42 relative to laminating roller 92 as swing arm assembly is moved to the closed position.

Figure 4:
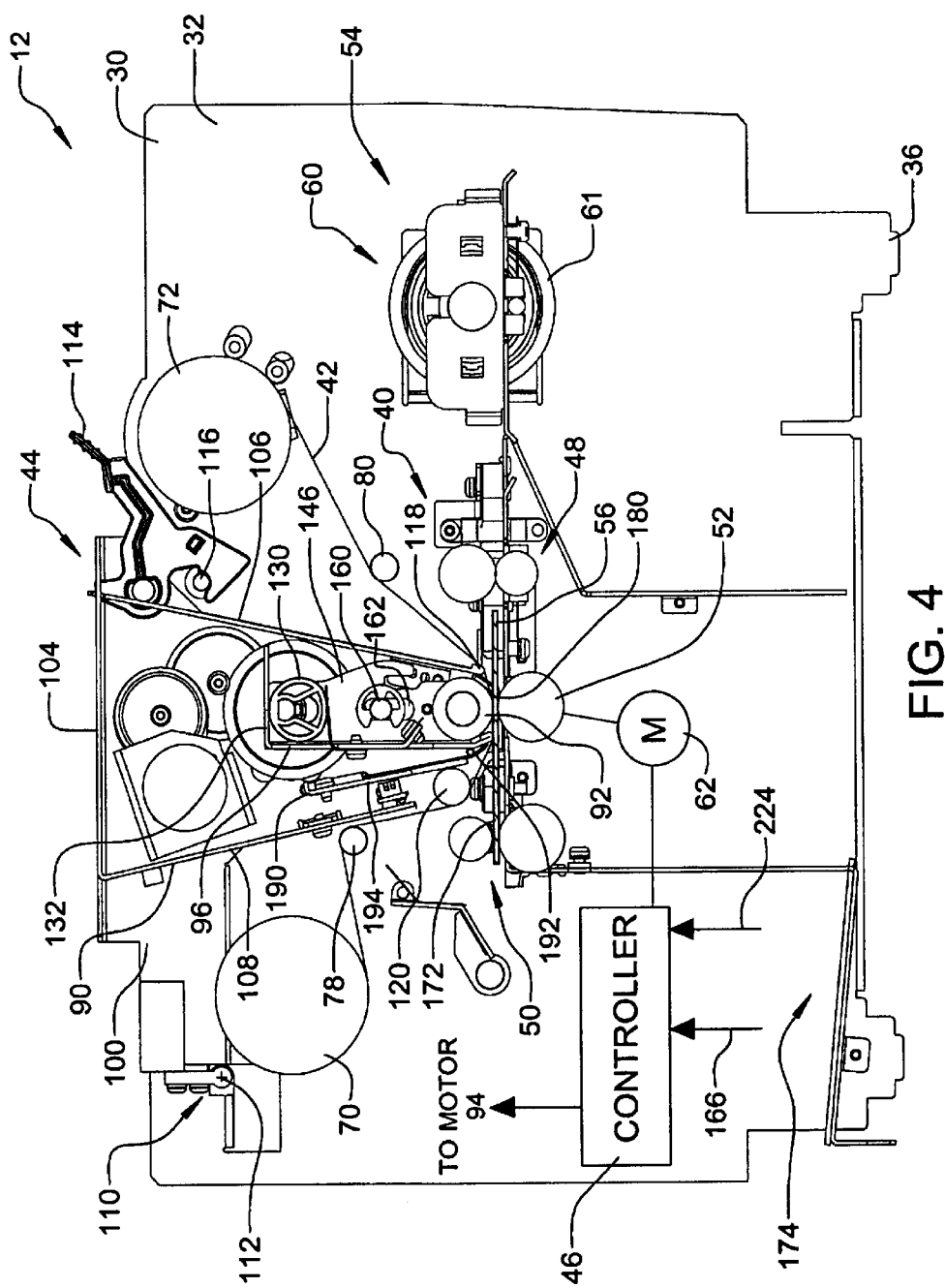
FIGS. 4 and 5 are simplified side views of an identification card laminator with a housing, a side plate of an interior frame, and a side plate of a swing frame removed.
Figure 5:
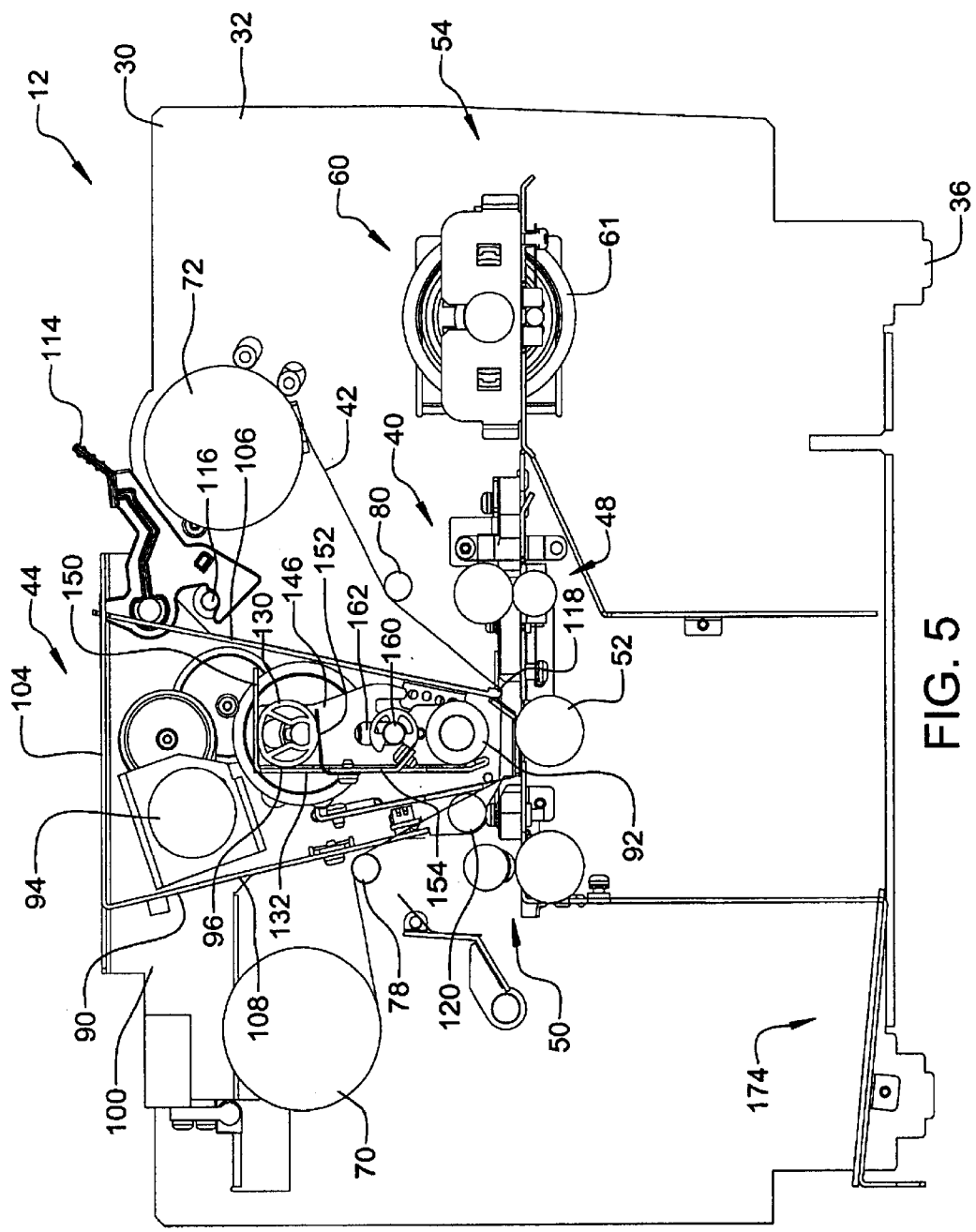

Overlaminate material 42 is fed under laminating roller 92, as shown in FIGS. 4 and 5. Laminating roller 92 is preferably a heated roller that is heated using conventional methods. However, other suitable laminating mechanisms can be substituted for laminating roller 92.

Further discussion of swing arm assembly 44 will be provided with reference to FIGS. 6 and 7. FIG. 6 is a front view of swing arm assembly 44 with front plate 106 removed. FIG. 7 is a side view of swing arm assembly taken generally along line 7—7 of FIG. 6, but with front plate 106 present. Roller actuator 96 is driven by motor 94 to move laminating roller 92 relative to swing frame 90 between a laminating position shown in FIG. 4 and a recessed position shown in FIG. 5. Laminating roller 92 is generally moved to the laminating position when swing arm assembly 44 is in the closed or operating position. When in the laminating position, laminating roller 92 is positioned adjacent to platen roller 52 to allow laminating roller 92 to apply pressure and heat to overlaminate material 42 and card 56 as desired, as shown in FIG. 4.

One embodiment of roller actuator 96 includes a cam 130 and a slide frame 132. Cam 130 is mounted to a cam shaft 134 that is mounted to swing frame side support plates 100 and 102. Cam shaft 134 is driven by motor 94 through a suitable driving arrangement. In accordance with one embodiment of the invention, motor 94 drives a belt 138 to drive a pulley 140, which in turn drives gears 142 and 144 to rotate cam shaft 134 and cam 130. One advantage of swing arm assembly 44 of the present invention is that the drive mechanism between motor 94 and roller actuator 96 always remains connected. This configuration avoids laminating roller positioning problems of the prior art.

Slide frame 132 movably supports laminating roller 92 between the laminating and recessed positions in response to the position of cam 130. Slide frame 132 includes side plates 146 and 148, and upper and lower cam follower plates 150 and 152 that are mounted to a back plate 154. Laminating roller 92 is supported for rotation between side plates 100 and 102 at brackets 156 and 158. Cam 130 is positioned between upper and lower cam follower plates 150 and 152, as shown in FIG. 6. The angular position of cam 130 directs the position of slide frame 132 through engagement with upper and lower cam follower plates 150 and 152 to move between the laminating and recessed positions relative to swing frame 90, as shown in FIGS. 4 and 5. A slide frame guide bar 160 extends between side support plates 100 and 102 and through slots 162 of side plates 146 and 148 of slide frame 132. Slide frame guide bar 160 operates to maintain slide frame 132 in the desired plane while it moves between the laminating and recessed positions.

Another embodiment of swing arm assembly 44 includes a sensor 164, shown in FIG. 7 mounted to swing frame 90 that is configured to sense a position of roller actuator 96. Sensor 164 can be of any suitable type and includes an output 166 that is received by controller 46 and indicates whether the laminating roller 92 is in the laminating or recessed position. Accordingly, sensor 164 can be located to directly detect a position of a component of slide frame 132 or laminating roller 92 to provide the desired position detection function. For example, sensor 164 can be mounted to side plate 102 of swing frame 90 and positioned to detect, for example, the position of upper follower plate 150 relative to swing frame 90 to detect whether laminating roller 92 is in the full laminating position, as shown in FIG. 7.

Controller 46 operates to control the components of laminator 12 in accordance with instructions from a host application. The host application typically runs on a personal computer (not shown) and communicates with controller 46 through a suitable connection, such as cable 170 shown in FIG. 2. Alternatively, laminator 12 can include memory for storage of the application, which can then be executed by controller 46. Control signals from controller 46 and power can be provided to the components of laminator 12, such as the heater for laminating roller 92, card transport motor 62, card flipper motor 61, motor 94, and sensor 164, through conventional connections while allowing swing arm assembly 44 to pivot between the open and closed positions.

During a laminating operation, laminating roller 92 is placed in the laminating position, as shown in FIG. 4. A card 56, that is received at input 54 by card flipper 60 or card feed rollers 48 of card transport 40, is fed between laminating roller 92 and platen roller 52. Laminating roller 92 applies pressure and heat to overlaminate material 42 and card 56 to cause a portion of the overlaminate material 42 to transfer to a surface 172 of card 56. The transferred overlaminate material operates to protect surface 172 of card 56 from abrasion and environmental conditions. Card 56 can then be discharged by feed rollers 50 of card transport mechanism 40 to an output hopper 174.

Figure 8:
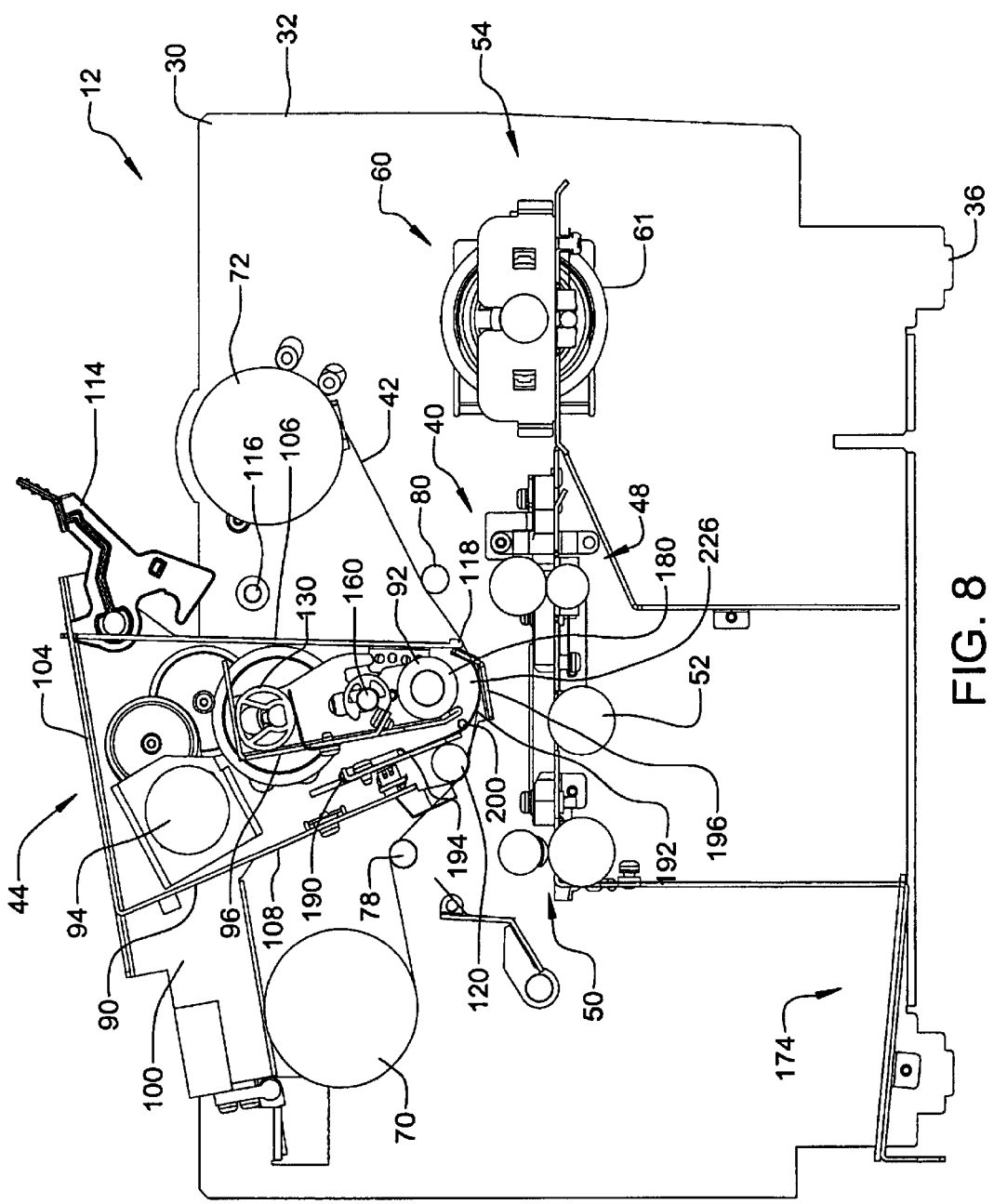
FIG. 8 is a simplified side view of an identification card laminator with a housing, a side plate of an interior frame, and a side plate of a swing frame removed.

When swing arm assembly 44 is in the open position, a laminating side 180 of laminating roller 92 could be exposed sufficiently for accidental contact therewith by a person reaching into the interior of card laminator 12 between side plates 100 and 102 to remove a jammed card, replace the supply of overlaminate material, or perform some other service to card laminator 12. In order to avoid such accidental contact with laminating roller 92, one embodiment of swing arm assembly 44 includes a heat shield 190 that is movably mounted on swing frame 90 and covers laminating side 180 of laminating roller 92 when swing arm assembly 44 is moved to the open position, as illustrated in FIG. 8.

In accordance with one embodiment of the invention, heat shield 190 includes a shield member 192 that is mounted to a slide support 194. Slide support 194 is slidably supported between side support plates 100 and 102 of swing frame 90 and supports shield member 192 between shielding and retracted positions. When in the retracted position shown in FIG. 4, laminating side 180 of laminating roller 92 remains exposed for laminating operations. When heat shield 190 is in the shielding position shown in FIG. 8, shield member 192 covers the laminating side 180 of laminating roller 92 between front and rear plates 106 and 108 of swing frame 90 to protect a user from accidental contact therewith.

Shield member 192 is preferably a thin spring sheet that curls into a cylinder or partial cylinder when it is not guided or restrained. Shield guides, such as bottom flanges 196 and 198 and guide bar 200 control the location of shield member 192 as it is moved between the retracted and shielding positions, as shown in FIGS. 3, 7 and 8.

Figure 9:
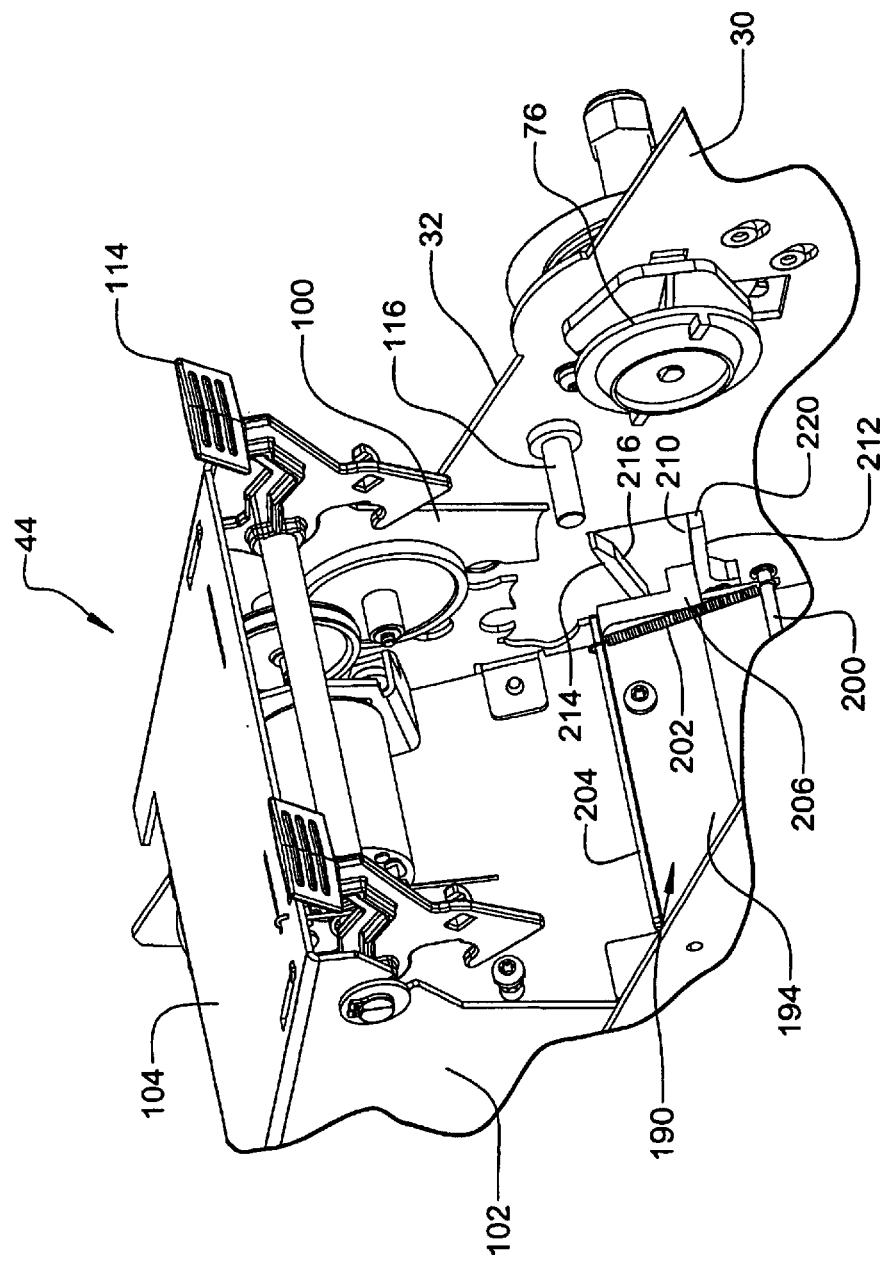
FIG. 9 is a partial perspective view of swing arm assembly mounted to a frame with a portion of the swing arm assembly cut away to reveal components of a heat shield.

FIG. 9 is a partial perspective view of swing arm assembly 44 mounted to frame 30, with a portion of swing arm assembly 44 cut away. In the example shown in FIG. 9, one or more springs 202 are mounted to slide support 194 at top edge 204 and to swing frame 30 at shield guide bar 200 to bias heat shield 190 toward the shielding position.

Slide support 194 preferably includes cam legs or wings 206 that extend through slots 208 of side support plates 100 and 102 of swing frame 90, as shown in FIG. 3. As swing arm assembly 44 is pivoted from the open position to the closed position, wings 206 each engage and slide along a top surface 210 of a lower or first guide member 212 mounted to side plates 32 and 34 of frame 30. As the force applied by springs 202 is overcome by pressing on top plate 104 of swing frame 90, the engagement of wings 206 with their corresponding first guide members 212 direct slide frame 194 to move toward the retracted position. Heat shield 190 reaches the full retracted position when swing arm assembly 44 is closed and latches 114 fully engage latch pins 116. When latches 114 are flipped open to disengage latch pins 116, the bias force generated by springs 202 causes swing arm assembly 44 to automatically open slightly thus preventing swing arm assembly 44 from re-latching in the closed position.

In accordance with another embodiment of the invention, upper or second guide members 214, shown in FIG. 9, are used to ensure that heat shield 190 moves to the shielding position when swing arm assembly 44 is moved to the open position. During such movement of swing arm assembly 44, wings 206 engage and slide along a bottom surface 216 of second guide members 214. This engagement between wings 206 and second guide members restricts the movement of slide support 194 relative to frame 30 and forces movement of slide support 194 relative to swing frame 90 to move heat shield 190 toward the shielding position. Wings 206 are released from second guide member 216 at a back edge 218 as swing arm assembly 44 continues moving toward the full open position, as shown in FIG. 3. Preferably, each pair of first and second guide members 212 and 216 are formed of a single component 220 that is mounted to one of the side plates 32 and 34 of frame 30.

Laminating roller 92 can only perform laminating operations when heat shield 190 is in the retracted position and swing arm assembly 44 is in the full closed position. In accordance with one embodiment of the invention, a shield sensor 222, shown schematically in FIG. 7, is provided to sense the position of shield 190. For example, shield sensor 222 can be mounted to rear plate 108 of swing frame 90 and indicates a position of slide support 194. Controller 46 is configured to receive a signal 224 from shield sensor 222 and preferably moves laminating roller 92 to the recessed position through control of motor 94 when heat shield 190 is in the shielding position. This produces a gap 226 between laminating roller 92 and shield member 192, as shown in FIG. 8, which reduces heat transfer from laminating roller 92 to shield member 94 and ensures that shield member 94 will be safe to touch. Shield sensor 222 can be any suitable sensor and is preferably positioned to detect a position of slide support 194 relative to swing frame 90.

Although the present invention has been described with reference to preferred embodiments, workers skilled in the art will recognize that changes may be made in form and detail without departing from the spirit and scope of the invention.

What is claimed is:

1. A swing arm assembly for use in a card laminator having a frame, the swing arm assembly comprising:
   a swing frame rotatably mountable to the frame for pivotal movement relative to the frame between open and closed positions;
   a laminating roller mounted to the swing frame;
   a motor mounted to the swing frame and configured to drive a roller actuator to move the laminating roller relative to the swing frame between a laminating position and a recessed position; and
   a sensor mounted to the swing frame and configured to sense a position of the roller actuator.

2. The swing arm assembly of claim 1, wherein the roller actuator includes:
   a cam mounted to the swing frame and driven by the motor; and
   a slide frame supported by the swing frame and including a cam follower engaging the cam, and side members supporting the laminating roller;
   wherein the slide frame supports the laminating roller between the laminating and recessed positions in response to a position of the cam.

3. The swing arm assembly of claim 1 including a heater for heating the laminating roller.

4. The swing arm assembly of claim 1 including a heat shield movably mounted on the swing frame between the shielding position in which the laminating roller is at least partially covered by the shield, and a retracted position in which the laminating roller is exposed.

5. The swing arm assembly of claim 4 including a sensor mounted to the swing frame and configured to sense a position of the heat shield.

6. The swing arm assembly of claim 4, wherein the laminating roller is moved to the recessed position when the heat shield is in the shielding position.

7. A laminator comprising:
   a base frame;
   a swing arm assembly comprising:
   a swing frame rotatably mounted to the base frame for pivotal movement relative to the base frame between open and closed positions;
   a laminating roller mounted to the swing frame;
   a motor mounted to the swing frame and configured to drive a roller actuator to move the laminating roller relative to the swing frame between a laminating position and a recessed position; and
   a sensor mounted to the swing frame and configured to sense a position of the roller actuator.

8. The laminator of claim 7 including a platen roller mounted to the base frame; wherein the laminating roller is positioned adjacent the platen roller when the laminating roller is in the laminating position and the swing frame is in the closed position, and the laminating roller is spaced from the platen roller when the laminating roller is in the recessed position and the swing frame is in the closed position, or when the swing frame is in the open position.

9. The laminator of claim 7, wherein the roller actuator includes:
   a cam mounted to the swing frame and driven by the motor; and
   a slide frame supported by the swing frame and including a cam follower engaging the cam, and side members supporting the laminating roller;
   wherein the slide frame supports the laminating roller between the laminating and recessed positions in response to a position of the cam.

10. The laminator of claim 8, wherein the platen roller is mounted to side plates of the base frame.

11. The laminator of claim 7 including a hinge having a first hinge member attached to the swing arm assembly and configured to pivot about an axis for movement of the swing frame between the open and closed positions.

12. The laminator of claim 7 including a supply of overlaminate material extending between the laminating roller and a platen roller mounted to the base frame.

13. The laminator of claim 7 including a latch configured to maintain the swing frame in the closed position.

14. The laminator of claim 7 including a transport mechanism configured to transport individual cards between the laminating roller and a platen roller that is mounted to the base frame.

15. The laminator of claim 8 including a heater for heating the laminating roller.

16. The laminator of claim 7 including a heat shield movably mounted on the swing frame between the shielding position in which the laminating roller is at least partially covered by the shield, and a retracted position in which the laminating roller is exposed.

17. The laminator of claim 16 including a sensor mounted to the swing frame and configured to sense a position of the heat shield.

18. The laminator of claim 16, wherein the laminating roller is moved to the recessed position when the heat shield is in the shielding position.

19. A laminator comprising:
   a base frame;
   a swing arm assembly comprising:
   a swing frame rotatably mounted to the base frame for pivotal movement relative to the base frame between open and closed positions;
   a laminating roller mounted to the swing frame;
   a motor mounted to the swing frame; and
   a roller actuator including a cam mounted to the swing frame and driven by the motor; and a slide frame supported by the swing frame, the slide frame having a cam follower engaging the cam and side members supporting the laminating roller; wherein the slide frame supports the laminating roller between laminating and recessed positions in response to a position of the cam.

20. The laminator of claim 19 including a platen roller mounted to the base frame; wherein the laminating roller is positioned adjacent the platen roller when the laminating roller is in the laminating position and the swing frame is in the closed position, and the laminating roller is spaced from the platen roller when the laminating roller is in the recessed position and the swing frame is in the closed position, or when the swing frame is in the open position.

21. The laminator of claim 20, wherein the platen roller is mounted to side plates of the base frame.

22. The laminator of claim 19 including a hinge having a first hinge member attached to the swing arm assembly and configured to pivot about an axis for movement of the swing frame between the open and closed positions.

23. The laminator of claim 19 including a supply of overlaminate material extending between the laminating roller and a platen roller mounted to the base frame.

24. The laminator of claim 19 including a latch configured to maintain the swing frame in the closed position.

25. The laminator of claim 19 including a transport mechanism configured to transport individual cards between the laminating roller and a platen roller that is mounted to the base frame.

26. The laminator of claim 20 including a heater for heating the laminating roller.

27. The laminator of claim 19 including a heat shield movably mounted on the swing frame between the shielding position in which the laminating roller is at least partially covered by the shield, and a retracted position in which the laminating roller is exposed.

28. The laminator of claim 19 including a sensor mounted to the swing frame and configured to sense a position of the laminating roller.

29. The laminator of claim 27 including a sensor mounted to the swing frame and configured to sense a position of the heat shield.

30. The laminator of claim 27, wherein the laminating roller is moved to the recessed position when the heat shield is in the shielding position.

\* \* \* \* \*